United States Patent
Rojstaczer et al.

[11] Patent Number: 5,935,372
[45] Date of Patent: Aug. 10, 1999

[54] ADHESIVE SEALANT FOR BONDING METAL PARTS TO CERAMICS

[75] Inventors: Sergio Rojstaczer, Amherst; David Y. Tang, E. Amherst; Jerald C. Rosenfeld, Amherst, all of N.Y.

[73] Assignee: Occidental Chemical Corporation, Dallas, Tex.

[21] Appl. No.: 08/848,624

[22] Filed: Apr. 29, 1997

[51] Int. Cl.[6] .................... C09J 183/04; C09J 163/00
[52] U.S. Cl. ............... 156/329; 156/330; 156/330.9; 428/448; 428/450; 428/441; 428/414; 428/416; 428/413; 525/423; 525/476; 524/366; 524/317; 524/233; 524/377
[58] Field of Search .................. 525/423, 476; 524/366, 317, 233, 377; 428/414, 416, 448, 450; 156/330, 329, 330.9

[56] References Cited

U.S. PATENT DOCUMENTS

| | | |
|---|---|---|
| 4,480,009 | 10/1984 | Berger . |
| 5,180,627 | 1/1993 | Inoue et al. . |
| 5,252,703 | 10/1993 | Nakajima et al. . |
| 5,654,081 | 8/1997 | Todd .............................. 428/209 |
| 5,677,393 | 10/1997 | Ohmori et al. ...................... 525/423 |

FOREIGN PATENT DOCUMENTS

| | | |
|---|---|---|
| 5140525 | 6/1993 | Japan . |
| 5311142 | 11/1993 | Japan . |
| 6157875 | 6/1994 | Japan . |
| 6172716 | 6/1994 | Japan . |
| WO9414911 | 12/1993 | WIPO . |

*Primary Examiner*—Melvyn I. Marquis
*Assistant Examiner*—Caixia Lu-Rutt
*Attorney, Agent, or Firm*—Richard D. Fuerle; Anne E. Brookes

[57] ABSTRACT

Disclosed is a blend capable of forming a semi-interpenetrating network when cured of (A) a solution of about 30 to about 50 wt % solids in an organic solvent of a fully imidized polyimidesiloxane and (B) about 5 to about 30 pbw per 100 pbw of the polyimidesiloxane of an epoxy resin which comprises a cycloaliphatic epoxy and an epoxy curing agent. The polyimidesiloxane is the reaction product of an aromatic dianhydride and diamine. The diamine is about 5 to about 80 mole % non-siloxane containing aromatic diamine and the remainder a siloxane diamine, where the siloxane diamine is about 40 to about 80 wt % of the weight of the polyimidesiloxane. The blend is used to bond metal parts to ceramic packages.

20 Claims, 1 Drawing Sheet

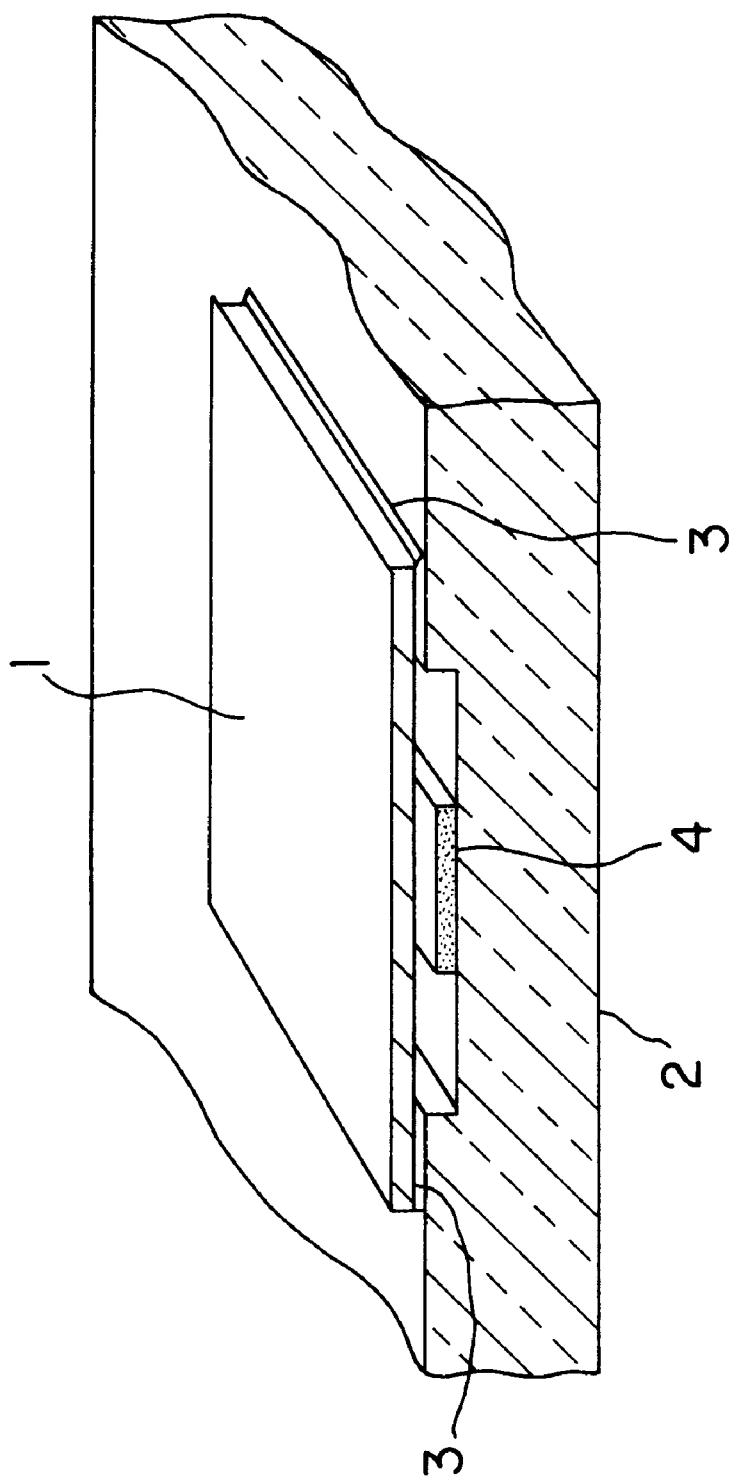

ADHESIVE SEALANT FOR BONDING METAL PARTS TO CERAMICS

BACKGROUND OF THE INVENTION

This invention relates to a compliant adhesive sealant for use in bonding parts, especially metal lids, to chip packages, especially ceramic chip packages. In particular, it relates to a blend of a solution of a cycloaliphatic epoxy and a polyimidesiloxane which has a high siloxane content.

In typical ceramic packages, integrated circuit (IC) chips are attached to the package and are sealed under a metallic lid. In hermetic packages, the lid is welded to a metallization layer, while in non-hermetic packages, an organic adhesive can be used. Organic adhesives are less expensive to use because they bond at lower temperatures than those required for glass-sealing. In order to obtain a reliable bond between materials that have different expansivities (CTEs), a compliant (low modulus) flexible adhesive is required.

Silicone resins are a commonly used adhesive sealant for attaching metallic lids to ceramics. To complete the bond, it is necessary to cure the silicone resin in an oven. Since the silicone resin is a thermoset resin and lacks strength at high temperatures, hydrostatic pressure must be applied to the oven in order to retain integrity of the seal. This bond is a batch process and it constitutes a bottleneck in manufacturing the printed circuit boards.

SUMMARY OF THE INVENTION

We have discovered that a blend of a solution of polyimidesiloxane and a cycloaliphatic epoxy is particularly effective at sealing parts, especially metal parts, to substrates, especially ceramic substrates. The adhesive blend of this invention can be cured in an automatic, continuous process without the need of a pressurized oven (autoclave). In fact, no separate heating step is required because a subsequent heating step in the manufacturing process, which occurs when the package is mounted on a circuit board, is adequate to cure the adhesive of this invention. The blends of this invention are stable and can be stored for at least three months at room temperature.

BRIEF DESCRIPTION OF THE DRAWINGS

The accompanying drawing is a cut away isometric view of a portion of an integrated circuit package and shows an aluminum lid mounted on a ceramic package using an adhesive blend according to this invention.

DESCRIPTION OF THE PREFERRED EMBODIMENTS

In the accompanying drawing, an aluminum lid 1 is bonded to ceramic package 2 using an adhesive 3 according to this invention. An IC chip 4 is protected by lid 1.

The adhesive blend of this invention requires the preparation of at least two separate components—a solution of a polyimidesiloxane resin and an epoxy resin. The solution of the polyimidesiloxane resin is made by first preparing a polyamic acid. The polyamic acid is prepared in an organic solvent by reacting a dianhydride with a mixture of two diamines—an aromatic non-siloxane containing diamine and a siloxane containing diamine.

ORGANIC SOLVENT

The organic solvent should be a low boiling solvent so that the blend can be dried without curing; a boiling point of less than 180° C. is preferred. Suitable organic solvents include propylene glycol methyl ether (PM), propylene glycol methyl ether acetate (PMA), dipropylene glycol methyl ether (DPM), dipropylene glycol methyl ether acetate (DPMA), N-methylpyrrolidone (NMP), dimethylacetamide (DMAC), 2-vinyl pyrrolidone, acetone, benzene, toluene, xylene, "Cellosolve" (glycol ethyl ether), "Cellosolve acetate" (hydroxyethyl acetate glycol monoacetate or 2-ethoxyethylacetate, "EEA"), diethyl ether, dichloromethane, dimethyl formamide (DMF), ethyl alcohol, methyl isobutyl ketone, methyl ethyl ketone, sulfolane, dimethyl sulfoxide (DMSO), hexamethylphosphoramide (HMPA), tetramethyl urea (TMU), diethyleneglycol diethyl ether, 1,2-dimethoxyethane (monoglyme), diethylene glycol dimethyl ether (diglyme) or 1,2-bis(2-methoxyethoxy) ethane, also known as triethylene glycol ether or triglyme (TG), bis [2-(2-methoxyethoxy) ethyl)] ether (tetraglyme), bis(2-methoxyethyl) ether, tetrahydrofuran, m-dioxane, and p-dioxane. PM, PMA, and DPMA, are preferred as they are good solvents for polyamic acids.

DIANHYDRIDE

Any aromatic dianhydride or combination of aromatic dianhydrides can be used as the dianhydride monomer in forming the polyimide. Examples of suitable dianhydrides include:

1,2,5,6-naphthalene tetracarboxylic dianhydride;
1,4,5,8-naphthalene tetracarboxylic dianhdyride;
2,3,6,7-naphthalene tetracarboxylic dianhydride;
2-(3',4'-dicarboxyphenyl) 5,6-dicarboxybenzimidazole dianhydride;
2-(3',4'-dicarboxyphenyl) 5,6-dicarboxybenzoxazole dianhydride;
2-(3',4'-dicarboxyphenyl) 5,6-dicarboxybenzothiazole dianhydride;
2,2',3,3'-benzophenone tetracarboxylic dianhydride;
2,3,3',4'-benzophenone tetracarboxylic dianhydride;
3,3',4,4'-benzophenone tetracarboxylic dianhydride (BTDA);
2,2',3,3'-biphenyl tetracarboxylic dianhydride;
2,3,3',4'-biphenyl tetracarboxylic dianhydride;
3,3',4,4'-biphenyl tetracarboxylic dianhydride (BPDA);
bicyclo-[2,2,2]-octen-(7)-2,3,5,6-tetracarboxylic-2,3,5,6-dianhydride;
thio-diphthalic anhydride;
bis(3,4-dicarboxyphenyl) sulfone dianhydride;
bis(3,4-dicarboxyphenyl) sulfoxide dianhydride;
bis(3,4-dicarboxyphenyl oxadiazole-1,3,4) paraphenylene dianhydride;
bis(3,4-dicarboxyphenyl) 2,5-oxadiazole 1,3,4-dianhydride;
bis[2,5-(3',4'-dicarboxydiphenylether)] 1,3,4-oxadiazole dianhydride;
bis(3,4-dicarboxyphenyl) ether dianhydride or 4,4'-oxydiphthalic anhydride (ODPA);
bis(3,4-dicarboxyphenyl) thioether dianhydride;
bisphenol A dianhydride;
bisphenol S dianhydride;
2,2-bis(3,4-dicarboxyphenyl) hexafluoropropane dianhydride or 5,5-[2,2,2-trifluoro-1-(trifluoromethyl) ethylidene] bis(1,3-isobenzofurandione) (6FDA);
hydroquinone bisether dianhydride;
bis(3,4-dicarboxyphenyl) methane dianhydride;
cyclopentadienyl tetracarboxylic acid dianhydride;
cyclopentane tetracarboxylic dianhydride;
ethylene tetracarboxylic acid dianhdyride;
perylene 3,4,9,10-tetracarboxylic dianhydride;

pyromellitic dianhydride (PMDA);
tetrahydrofuran tetracarboxylic dianhydride; and
resorcinol dianhydride.

The preferred aromatic dianhydride is ODPA as it is readily available and has been found to give superior properties. The dianhydrides can be used in their tetraacid form or as mono, di, tri, or tetra esters of the tetra acid, but the dianhydride form is preferred because it is more reactive.

AROMATIC DIAMINE

To prevent the polyimidesiloxane from being too soft, about 5 to about 80 mole % of the diamine content of the polyimidesiloxane should be a non-siloxane containing aromatic diamine; preferably, about 40 to about 75 mole % of the diamine content is non-siloxane containing aromatic diamine. Examples of suitable aromatic diamines include:
m- and p-phenylenediamine (PDA);
2,5-dimethyl-1,4-phenylenediamine;
2,4-diaminotoluene (TDA);
2,5- and 2,6-diaminotoluene;
p- and m-xylenediamine;
4,4'-diaminobiphenyl;
4,4'-diaminodiphenyl ether or 4,4'-oxydianiline (ODA);
4,4'-diaminobenzophenone;
3,3', 3,4', or 4,4'-diaminophenyl sulfone or m,m-, m,p- or p,p- sulfone dianiline;
4,4'-diaminodiphenyl sulfide;
3,3' or 4,4'-diaminodiphenylmethane or m,m- or p,p-methylene dianiline;
3,3'-dimethylbenzidine;
α,α'-bis(4-aminophenyl)-1,4-diisopropyl benzene or 4,4'-isopropylidenedianiline or bisaniline p;
α,α'-bis(4-aminophenyl)-1,3-diisopropyl benzene or 3,3'-isopropylidonedianiline or bisaniline m;
1,4-bis(p-aminophenoxy)benzene;
1,3-bis(p-aminophenoxy)benzene;
4,4'-bis(4-aminophenoxy)biphenyl;
1,3-bis(3-aminophenoxy)benzene (APB);
2,4-diamine-5-chlorotoluene;
2,4-diamine-6-chlorotoluene;
2,2-bis(4[4-aminophenoxy]phenyl)propane (BAPP);
trifluoromethyl-2,4-diaminobenzene;
trifluoromethyl-3,5-diaminobenzene;
2,2'-bis(4-aminophenyl)-hexafluoropropane (6F diamine);
2,2'-bis(4-phenoxy aniline) isopropylidene;
2,4,6-trimethyl-1,3-diaminobenzene;
4,4'-diamino-2,2'-trifluoromethyl diphenyloxide;
3,3'-diamino-5,5'-trifluoromethyl diphenyloxide;
4,4'-trifluoromethyl-2,2'-diaminobiphenyl;
2,4,6-trimethyl-1,3-diaminobenzene;
diaminoanthraquinone;
4,4'-oxybis[(2-trifluoromethyl)benzeneamine] (1,2,4-OBABTF);
4,4'-oxybis[(3-trifluoromethyl)benzeneamine];
4,4'-thiobis[(2-trifluoromethyl)benzeneamine];
4,4'-thiobis[(3-trifluoromethyl)benzeneamine];
4,4'-sulfoxylbis[(2-trifluoromethyl)benzeneamine];
4,4'-sulfoxylbis[(3-trifluoromethyl)benzeneamine];
4,4'-ketobis[(2-trifluoromethyl)benzeneamine]; and
4,4'-[(2,2,2-trifluoromethyl-1-(trifluoromethyl)ethylidine) bis(3-trifluoromethyl)benzeneamine].

The preferred aromatic diamines are ODA, TDA, APB, and BAPP, or a combination of these, due to their excellent properties.

SILOXANE DIAMINE

About 40 to about 80 wt % of the polyimidesiloxane weight is a diamine that contains siloxane. At less than 40 wt % the polyimidesiloxane is not rubbery enough, and at more than 80 wt % the polymer loses high temperature strength. Preferably, the siloxane-containing diamine is about 45 to about 65 wt % of the polyimidesiloxane weight. The siloxane-containing diamines can be either aromatic or non-aromatic, but non-aromatic diamines are preferred as they are more readily available. Examples of siloxane diamines that can be used include compounds having the formula

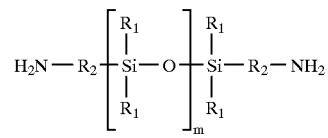

where $R_1$ and $R_2$ are mono and diradicals, respectively, each independently selected from a substituted or unsubstituted 1 to 12 carbon atom aliphatic group or a substituted or unsubstituted 6 to 10 carbon atom aromatic group. Examples of ($R_1$) monoradicals include

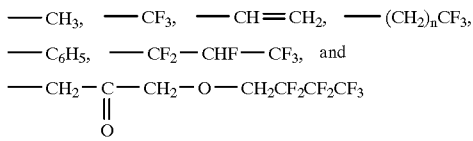

and $R_1$ is preferably methyl. Examples of diradicals ($R_2$) include $-(CH_2)_n-$, $-(CH_2)_n-CF_2-$ and $-C_6H_4-$, where "n" is 1 to 10 and $R_2$ is preferably methylene. In the formula, "m" is at least 5 to obtain a high weight percentage of siloxane in the polymer; preferably m is about 9 to about 12, (Siloxane diamines are herein denoted by the notation "$G_m$").

PREPARATION OF POLYIMIDESILOXANE SOLUTION

Generally, stoichiometric quantities of diamine and dianhydride monomers are used to obtain polyimides of the highest molecular weight, but the equivalent ratio of dianhydride to diamine can range from 1:2 to 2:1. A solution of the monomers in the solvent is prepared, preferably about 5 to about 20 wt % solids, where "solids" means components other than the solvent. Upon the addition of the monomers to the solvent, polymerization will occur at room temperature to form a polyamic acid. The polyamic acid is then imidized. This can be accomplished chemically by, for example, the addition of acetic anhydride, or by heating, preferably at about 130 to about 200° C. To achieve reproducible molecular weights, it is preferable to end cap the polyimidesiloxane with a monofunctional diamine or anhydride such as, for example, phthalic anhydride. Solvent can then be evaporated to concentrate the solution.

EPOXY RESIN

The epoxy resin used in the blend includes a cycloaliphatic epoxy and an epoxy curing agent. Examples of cycloaliphatic epoxies include:
vinylcyclohexenediepoxide;
limonene diepoxide;
(3,4-epoxy-cyclohexylmethyl)-3,4-epoxy-cyclohexane carboxylate;
(3,4-epoxy-6-methyl-cyclohexylmethyl)-3,4-epoxy-6-methylcyclohexanecarboxylate;

ethylene glycol-bis(4-oxatetracyclo(6.2.1.0$^{2,7}$0$^{3,5}$) hendec-9-yl)ether;
glycerol-bis (4-oxatetracyclo(6.2.1.0$^{2,7}$0$^{3,5}$)hendec-9-yl) ether;
(4-oxatetracyclo(6.2.1.0$^{2,7}$0$^{3,5}$)hendec-9-yl)glycidyl ether;
3-(3',4'-epoxycyclohexyl)-9,10-epoxy-2,4-dioxaspiro(5.5) undecane;
3-(3',4'-epoxy-6-methyl-cyclohexyl)-9,10-epoxy-7-methyl-2,4-dioxaspiro (5.5) undecane;
dicyclopentadienediepoxide;
glycidyl-2,3-epoxy-cyclopentylether;
bis (cyclopentenyl) ether diepoxide;
2,3-epoxybutyl-2,3-epoxycyclopentylether;
epoxypentyl-2,3-epoxycyclopentylether;
9,10-epoxystearyl-2,3,cyclopentylether;
3,4-epoxycyclohexylmethyl-2,3-cyclopentylether;
2,2,5,5-tetramethyl-3,4-epoxycyclohexylmethyl-2,3-cyclopentylether;
2,2,5,5,6-pentamethyl-3,4-epoxycyclopentylether;
2,3-epoxycyclopentyl-9,10-epoxystearate;
2,3-epoxycyclopentyl-3,4-epoxycyclohexylcarboxylate;
2,3-epoxycyclopentyl-2,2,5,5-tetramethyl-3,4-epoxycyclohexylcarboxylate;
(3,4-epoxy-2,5-endomethylene-cyclohexylmethyl)-3,4-epoxy-2,5-endomethylene-cyclohexanecarboxylate;
bis(3,4-epoxy-2,5-endomethylene-cyclohexylmethyl) succinate;
bis(3,4-epoxy-2,5-endomethylene-cyclohexylmethyl) formate;
bis(3,4-epoxy-2,5-endomethylene-hexahydrobenzal) pentaerythritol;
3-(3'4'-epoxy-2',5'-endomethylenecyclohexylmethyl-9-10-epoxy-2,4-dioxaspiro(5.5)undecane;
bis(3-oxatricyclo (3.2.1.0$^{2,4}$)oct-6-yl) carbonate;
bis(3-oxatricyclo (3.2.1.0$^{2,4}$)oct-6-yl) succinate;
(3-oxatricyclo(3.2.1.0$^{2,4}$)oct-6-yl)-3,4-epoxycyclohexylcarboxylate;
(3-oxatricyclo(3.2.1.0$^{2,4}$)oct-6-yl)-9,10-epoxyoctadecanoate;
(4-oxatetracylo(6.2.1.0$^{2,7}$0$^{3,5}$)hendec-9-yl)-2,3-epoxybutylether;
(4-oxatetracylo(6.2.1.0$^{2,7}$0$^{3,5}$)hendec-9-yl)-6-methyl-3,4-epoxycyclohexylmethylether;
(4-oxatetracyclo(6.2.1.0$^{2,7}$0$^{3,5}$)hendec-9-yl)3-4 epoxycyclohexylether;
(4-oxatetracyclo(6.2.1.0$^{2,7}$0$^{3,5}$)hendec-9-yl)-3-oxatricyclo (3.2.1.0$^{2,4}$)-oct-6-yl-ether;
(4-oxatetracyclo(6.2.1.0$^{2,7}$0$^{3,5}$)hendec-9-yl)-3,4-epoxy-2,5-endomethylene-cyclohexylmethylether;
ethylene glycol-bis(4-oxatetracyclo(6.2.1.0$^{2,7}$0$^{3,5}$) hendec-9-yl) ether;
1,3-propylene glycol-bis(3-oxatetracyclo(6.2.1.0$^{2}$·0$^{3,5}$) hendec-9-yl) ether;
glycerol-bis(4-oxatetracyclo (6.2.1.0$^{2,7}$0$^{3,5}$)hendec-9-yl) ether;
bis(4-oxatetracyclo(6.2.1.0$^{2,7}$0$^{3,5}$)hendec-9-yl) ether;
bis(4-oxatetracyclo(6.2.1.0$^{2,7}$0$^{3,5}$)hendec-9-yl) formal;
bis(4-oxatetracyclo(6.2.1.0$^{2,7}$0$^{3,5}$)hendec-9-yl) succinate;
bis(4-oxatetracyclo(6.2.1.0$^{2,7}$0$^{3,5}$)hendec-9-yl) maleate;
bis(4-oxatetracyclo(6.2.1.0$^{2,7}$0$^{3,5}$)hendec-9-yl) phthalate;
bis(4-oxatetracyclo(6.2.1.0$^{2,7}$0$^{3,5}$)hendec-9-yl) adipate;
bis(4-oxatetracyclo(6.2.1.0$^{2,7}$0$^{3,5}$)hendec-9-yl) sebacate;
tris(4-oxatetracyclo(6.2.1.0$^{2,7}$0$^{3,5}$)hendec-9-yl) trimellitate;
9,10-epoxy-octadecanoic acid-[4-oxatetracyclo(6.2.1.0$^{2,7}$0$^{3,}$$_5$)hendec-9-yl] ester; and
9,10,12,13-diepoxy-octadecanoic acid [4-oxatetracylo (6.2.1.0$^{2,7}$0$^{3,5}$)hendec-9-yl]ester;

The preferred cycloaliphatic epoxy is (3,4-epoxycyclohexylmethyl)-3,4-epoxy-cyclohexane carboxylate because it has been found to work well.

As is known in the art of epoxy resins, an epoxy curing agent is required to be present. About 1 to about 15 pbw (parts by weight, based on the weight of the cycloaliphatic epoxy), of the curing agent can be used. Examples of epoxy curing agents include phenolic resins, amines, anhydrides, and carboxylic acids. The preferred epoxy curing agents are phenolic resoles because they give the best results.

About 0.2 to about 2 pbw (based on the weight of the cycloaliphatic epoxy) of an optional coupling agent can also be included to add strength to the epoxy resin. A suitable coupling agent is 3-aminopropyl triethoxysilane.

An optional plasticizer, such as di-N-decylphthalate, in an amount of about 0.2 to about 2 pbw (based on cycloaliphatic epoxy weight) can also be included.

BLEND

The blend is prepared by mixing a solution of the fully imidized polyimidesiloxane with the epoxy resin. The fully imidized solution of the polyimidesiloxane should be about 30 to about 50 wt % solids and preferably should have as high a solids content as possible to reduce the amount of solvent that needs to be evaporated. The same solvents used to prepare the polyimidesiloxane are preferably used to form this solution.

The blend is formed from about 5 to about 30 pbw of the epoxy resin per 100 pbw of the polyimidesiloxane. When less than 5 pbw are used, there is a loss of adhesion at higher temperatures and more than 30 pbw may result in a blend that is not sufficiently rubbery and does not have good flow. Preferably, about 5 to about 17 pbw epoxy resin should be used per 100 pbw of the polyimidesiloxane. The blend is formed by simply mixing the components, preferably by adding the epoxy resin to the solution of polyimidesiloxane.

The blend can be used as an adhesive to bond parts to packages. The parts can be made of metals, ceramics, or plastics and the packages can be made of ceramics or plastics (e.g., fire retardant epoxies, polyamides), but the invention is especially useful for bonding metal parts to ceramic packages such as $Al_2O_3$, $SiO_2$, BeO, Sic, AlN, and $Si_3N$. A convenient way of applying the blend is to dispense it from a syringe onto the metal part or the package. The blend on the part is dried to remove the solvent and obtain a tack-free bead; this can be accomplished by heating at about 110 to about 150° C. The coated metal part can then be mounted onto the ceramic package at a later time using heat and pressure, for example, 200° C. for 1 minute. Curing of the blend occurs at a temperature of about 180 to about 220° C. after about 30 seconds to about 2 minutes. The resulting cured blend can be considered to be a semi-interpenetrating network because the epoxy resin is crosslinked but the polyimidesiloxane is not. The following examples further illustrate this invention.

EXAMPLES

Three polyimidesiloxanes were prepared:

Polyimidesiloxane A

A clean, 5-liter, 3-necked flask having a mechanical stirrer in the middle and a Dean-Starke trap with condenser and nitrogen inlet on the side was purged with nitrogen. NMP (2.5 liters) from a fresh bottle and 375 ml of toluene were charged to the flask. Then ODPA (184.00 gm) was charged, followed by 25.00 gm of bis(3-aminopropyl) tetramethyldisiloxane ($G_1$), 225 gm bis(3-aminopropyl) polydimethylsiloxane ($G_9$, MW=841), and 66.00 gm APB. The charge was stirred overnight at room temperature then heated to reflux (165° C.) and the water of imidization was removed over about 4 hours at 165° C. Approximately ⅓ of the solvent was vacuum distilled off and the solution was cooled. The polymer was precipitated by dripping it slowly into stirred deionized water. The solids were filtered off, reslurried in deionized water, filtered again, washed twice with methanol and, finally, air dried overnight. The yield of polymer was 399.4 gm with Mn/Mw=21857/6967=3.1 by gel permeation chromatography (gpc).

Polyimidesiloxane B

Using the above procedure, 2.5 liters of NMP, 375 gm toluene, 175.00 gm BTDA, and 290.00 gm bis(3-aminopropyl) polydimethylsiloxane ($G_{13}$, MW=1131) were added to a 5 liter flask and stirred under nitrogen for 4 hours. Then 35.00 gm TDA was added and the mixture was stirred overnight at room temperature; 7.5 gm of polymer was recovered.

Polyimidesiloxane C

Using the above procedure, 345.00 gm BPDA, 45.00 gm TDA and 910.00 gm bis(aminopropyl) polydimethyl siloxane ($G_{13}$, MW=1131) in 5 liters of NMP and 750 ml of toluene were placed in a 12 liter flask; 19.5 gm diazobicyclo octane (DABCO) was used as an imidization catalyst. The mixture was heated for about 2 hours at 167 to 170° C.; 1092.4 gm of polymer was recovered.

Preparation of Blends

Components were added gradually, with mixing, in the order listed on the table that follows. If fumed silica was added to thicken the solution, it was added to the polymer solution at room temperature, then stirred 20 minutes (high speed stirrer) allowed to cool, and the remainder of the additives was added. The final mixing was done by putting the solution (in a vial) on a slowly rotating wheel for about two hours.

Film Preparation

Films were cast on polyethylene terephthalate (PET) coated with a release agent. Drying was done in a programmable circulating air oven by ramping the temperature up to 160° C. then holding it at 160° C. for 1 hour.

Testing

Squares of film were cut approximately 0.6×0.6 cm (¼×¼ inch) and were used to bond a 0.6 cm (¼ inch) square of aluminum sheet to a 2.5 cm (1 inch) square of ceramic at 180° C. (10 min., 4.4 newtons (1-lb) clamp).

The bonded pieces were measured for thickness to determine the decrease in film thickness, which is a measure of flow during bonding. The bonded pieces were tested at room temperature and at 220° C. for die shear strength (DSS) on a Hybrid Machine Products Model 1750 die shear tester with a hot stage.

The following table gives the blends prepared, their die shear strengths, their percent change in thickness on bonding, and their modulus of elasticity.

| PART 1 | 1 | 2 | 3 | 4 | 5 | 6 | 7 | 8 | 9 | 10 | 11 | 12 |
|---|---|---|---|---|---|---|---|---|---|---|---|---|
| Polyimidesiloxane A | 100 | 100 | 100 | 100 | 100 | 100 | 100 | 100 | 100 | 100 | 80 | 100 |
| Polyimidesiloxane B | 0 | 0 | 0 | 0 | 0 | 0 | 0 | 0 | 0 | | | |
| Polyimidesiloxane C | 0 | 0 | 0 | 0 | 0 | 0 | 0 | 0 | 0 | | 20 | |
| Cycloaliphatic diepoxy[1] | 0 | 0 | 15 | 15 | 15 | 0 | 15 | 15 | 15 phr | | | |
| Cycloaromatic diepoxy[2] | 0 | 15 | 0 | 0 | 0 | 20.6 | 0 | 0 | 0 | 15 | | 20 |
| Phenolic[3] | 0 | 5 | 5 | 5 | 5 | 5 | 5 | 5 | 5 | 5 | | 5 |
| Silane Coupling Agent[4] | 0 | 1 | 5 | 0 | 0 | 1 | 0 | 0 | 0 | 1 | | 1 |
| Phthalate Plasticizer[5] | 0 | 1 | | | | | | | | | | |
| $G_{25}$ | 0 | 0 | 2 | 5 | 10 | 0 | 0 | 0 | 0 | 0 | 0 | 0 |
| $G_9$ (amine terminated) | 0 | 0 | 0 | 0 | 0 | 0 | 5 | 10 | 15 | 0 | 0 | 0 |
| Die Shear Strength at 220° C. (kg/cm²) | 0 | 4.2 | 2.2 | 0.6 | 2.4 | 3.4 | 2.0 | 1.5 | 2.0 | 2.6 | 1.6 | 3.6 |
| % Change in Thickness in Bonding | −100 | −20 | −19 | −38 | −31 | −29 | −36 | −21 | −34 | −11 | −21 | −16 |
| Modulus of Elasticity | | | | | | | | | | | | |
| Wt % Solids | 45.0 | 45.8 | 47.4 | 48.0 | 49.0 | 42.8 | 47.1 | 47.2 | 47.3 | 48.8 | 49.4 | 50.2 |
| Solvent (s) | EEA | TG | TG | TG | TG | TG | 48.9 wt % TG 4.0 wt % PM | 45.3 wt % TG 7.5 wt % PM | 41.6 wt % TG 11.1 wt % PM | EEA | EEA | EEA |

| 2 | 13 | 14 | 15 | 16 | 17 | 18 | 19 | 20 | 21 | 22 |
|---|---|---|---|---|---|---|---|---|---|---|
| Polyimidesiloxane A | 0 | 0 | 100 | 100 | 100 | 100 | 100 | 100 | 100 | 100 |
| Polyimidesiloxane B | 50 | 75 | 0 | 0 | 0 | 0 | 0 | 0 | 0 | 0 |
| Polyimidesiloxane C | 50 | 25 | 0 | 0 | 0 | 0 | 0 | 0 | 0 | 0 |
| Cycloaliphatic diepoxy[1] | 0 | 0 | 15 | 15 | 15 | 7.5 | 22.5 | 15 | 15 | 15 |
| Cycloaromatic diepoxy[2] | 20 | 20 | | | | | | | | |
| Phenolic[3] | 5 | 5 | 10 | 10 | 10 | 5 | 15 | 5 | 5 | 10 |
| Silane coupling Agent[4] | 1 | 1 | 1 | 0.5 | 0 | 1 | 1 | 1 | 1 | 1 |
| Phthalate Plasticizer[5] | 0 | 0 | 1 | 1 | 1 | 1 | 1 | 1 | 1 | 1 |
| Terpene modified Novolak[6] | 0 | 0 | 0 | 0 | 0 | 0 | 0 | 0 | 5 | 0 |
| $G_{25}$ | 0 | 0 | 0 | 0 | 0 | 0 | 0 | 0 | 0 | 0 |
| $G_9$ (amine terminated) | 0 | 0 | 0 | 0 | 0 | 0 | 0 | 0 | 0 | 0 |
| Fumed Silica[7] | 0 | 0 | 0 | 0 | 0 | 0 | 0 | 0 | 0 | 4% |

| | | | | | | | | | | on Total |
|---|---|---|---|---|---|---|---|---|---|---|
| Die Shear Strength at 220° C. (kg/cm²) | 0 | 2.3 | 4.3 | 3.0 | 1.2 | 5.6 | 2.6 | 4.2 | 3.4 | — |
| % Change in Thickness in Bonding | −56 | −15 | −10 | −20 | −22 | −12 | −18 | −20 | −19 | — |
| Modulus of Elasticity | | | | | | | | | | |
| % Solids | 49.0 | 50.0 | 45.8 | 46.4 | 47.1 | 44.1 | 47.3 | 45.6 | 45.8 | 47.8 |
| Solvent | EEA | EEA | TG | TG | TG | TG | TG | TG | TG | TG |

[1] Alicyclic diepoxy carboxylate sold by Union Carbide as "ERL-4221"
[2] Bisphenol-A diepoxy sold by Union Carbide as "RSL. 1462"
[3] Phenolic resole sold by Occidental Chemical Corp. as "Varcum 29-217"
[4] H₂N(CH₃)₃Si(OCH₂CH₃)₃ sold by Union Carbide as "A1100"
[5] Diundecyl phthalate sold by Aristech Chemical Corp. as "PX-111"
[6] Terpene modified novolak sold by Occidental Chemical Corp. as "Varcum 29401"
[7] Fumed silica sold by Cabot Corp. as "Cabosil"

Comparative Examples 1, 2, and 10 to 14 show that when a cycloaliphatic epoxy was not used the adhesive had no strength at 220° C. and totally flowed from between the lid and the ceramic. (A percent change in thickness of about −20 to about −40 is desirable as adhesives in this range are neither too fluid nor too rigid.) Examples 3, 4, and 5 show that $G_{13}$ can be added as an epoxy curing agent to improve the flow while still maintaining some die shear strength at 220° C. Comparative Examples 2, 10, and 12 to 14 show that while the substitution of an aromatic epoxy for an aliphatic epoxy also gave good die shear strength and flow, the modulus was unacceptably high. Examples 7, 8, and 9 show that the addition of an amine end capped low molecular weight oligomer of $G_9$ and B4400 can also improve the flow while maintaining moderate die shear strength. Examples 13 and 14 show that changing the base polymer to a blend of higher siloxane content was successful. A 50/50 mole ratio is too soft but a 75/25 mole ratio worked fairly well.

In comparison to Example 15, Example 16 shows that less A1100 gave more flow but less die shear strength at 220° C. In Example 17, when no A1100 was present, flow was similar to Example 15 but the die shear strength was lower. Example 18 shows that when less epoxy was used the die shear strength was higher but there was less flow. Example 19 shows that when more epoxy and phenolic were used the die shear strength was lower but the flow was better. Example 20 shows that when less phenolic was used the die shear strength was good and the flow was better. Example 21 shows that when a blend of phenolics was used similar results were obtained but the die shear strength was lower.

We claim:

1. A blend capable of forming a semi-interpenetrating network when cured comprising (A) a solution of about 30 to about 50 wt % solids which comprises
    (1) organic solvent; and
    (2) a fully imidized polyimidesiloxane which comprises the reaction product of
        (a) aromatic dianhydride; and
        (b) diamine which comprises
            (i) about 5 to about 80 mole % non-siloxane containing aromatic diamine; and
            (ii) a siloxane diamine having the formula

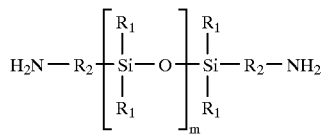

where $R_1$ and $R_2$ are mono and diradicals, respectively, selected from a substituted or unsubstituted 1 to 12 carbon atom aliphatic group or a substituted or unsubstituted 6 to 10 carbon atom aromatic group, m is at least 5, and the amount of said siloxane diamine is about 40 to about 80 wt % of said polyimidesiloxane; and (B) about 5 to about 30 pbw per 100 pbw of said polyimidesiloxane of an epoxy resin which comprises
    (1) a cycloaliphatic epoxy; and
    (2) an epoxy curing agent.

2. A blend according to claim 1 wherein said organic solvent is propylene glycol methyl ether, propylene glycol methyl ether acetate, or dipropylene glycol methyl ether acetate.

3. A blend according to claim 1 wherein said aromatic dianhydride is oxydiphthalic anhydride.

4. A blend according to claim 1 wherein said aromatic diamine is 4,4'-oxydianiline, 2,4-diaminotoluene, 1,3-bis(3-aminophenoxy) benzene, or 2,2-bis(4[4-aminophenoxy] phenyl) propane.

5. A blend according to claim 1 wherein $R_1$ is methyl, $R_2$ is —CH₂—, and m is 9 to 12.

6. A blend according to claim 1 wherein said cycloaliphatic epoxy is (3,4-epoxycyclohexylmethyl)-3,4-epoxy-cyclohexane carboxylate.

7. A blend according to claim 1 wherein said epoxy curing agent is a phenolic resole.

8. A blend according to claim 1 wherein said fully imidized polyimidesiloxane is end-capped with phthalic anhydride.

9. A method of bonding a part to a chip package comprising applying a blend according to claim 1 between said part and said package, evaporating the solvent from said blend, and heating to about 180 to about 220° C.

10. A method according to claim 9 wherein said part is metal and said package is ceramic.

11. A method according to claim 10 wherein said metal part is an aluminum lid which covers a silicon chip.

12. An article made according to the method of claim 9.

13. A blend capable of forming a semi-interpenetrating network when cured comprising
(A) a solution of about 30 to about 50 wt % solids which comprises
(1) organic solvent that has a boiling point under 180° C.; and
(2) a fully imidized polyimidesiloxane which comprises the reaction product of
(a) aromatic dianhydride; and
(b) diamine in an equivalent ratio with said dianhydride of 1:2 to 2:1, where said diamine comprises
(I) about 40 to about 75 mole % non-siloxane containing aromatic diamine; and
(ii) a siloxane diamine having the formula

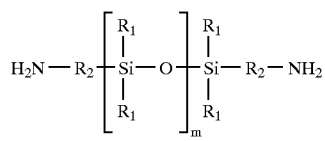

where $R_1$ and $R_2$ are mono and diradicals, respectively, selected from a substituted or unsubstituted 1 to 12 carbon atom aliphatic group or a substituted or unsubstituted 6 to 10 carbon atom aromatic group, m is 9 to 12, and the amount is said siloxane diamine is about 45 to about 65 wt % of said polyimidesiloxane; and
(B) an epoxy resin which comprises
(1) about 12 to about 17 pbw per 100 pbw of said polyimidesiloxane of a cycloaliphatic epoxy; and
(2) an epoxy curing agent.

14. A blend according to claim 13 wherein said aromatic dianhydride in oxydiphthalic anhydride.

15. A blend according to claim 13 wherein said aromatic diamine is 4,4'-oxydianiline, 2,4-diaminotoluene, 1,3-bis(3-aminophenoxy) benzene, or 2,2-bis(4[4-aminophenoxy]phenyl) propane.

16. A blend according to claim 13 wherein said cycloaliphatic epoxy is (3,4-epoxycyclohexylmethyl)-3,4-epoxy-cyclohexane carboxylate.

17. A method of bonding a part to a chip package comprising applying a blend according to claim 13 between said part and said chip package, evaporating the solvent from said blend, and heating to about 180 to about 220° C.

18. An article made according to the method of claim 13.

19. A blend capable of forming a semi-interpenetrating network when cured comprising
(A) a solution of about 30 to about 50 wt % solids which comprises
(1) organic solvent selected from the group consisting of N-methyl pyrrolidone, dimethylacetamide, and triglyme; and
(2) a fully imidized polyimidesiloxane end-capped with phthalic anhydride which comprises the reaction product of about 1 mole of oxydiphthalic anhydride with 1 mole of a diamine where said diamine comprises
(i) about 40 to about 75 mole % aromatic diamine selected from the group consisting of 4,4'-oxydianiline, 2,4-diaminotoluene, 1,3-bis(3-aminophenoxy) benzene, and 2,2-bis(4[4-aminophenoxy]phenyl) propane; and
(ii) a siloxane diamine having the formula

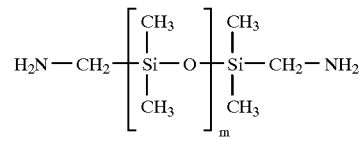

where m is 9 to 12 and the amount is said siloxane diamine is about 45 to about 65 wt % of said polyimidesiloxane; and
(B) an epoxy resin which comprises
(1) about 12 to about 17 pbw per 100 pbw of said polyimidesiloxane of (3,4-epoxycyclohexylmethyl)-3,4-epoxy-cyclohexane carboxylate; and
(2) about 1 to about 15 pbw of an epoxy curing agent.

20. A method of bonding a part to a chip package comprising applying a blend according to claim 19 between said part and said chip package, evaporating the solvent from said blend, and heating to about 180 to about 220° C.

* * * * *

UNITED STATES PATENT AND TRADEMARK OFFICE

CERTIFICATE OF CORRECTION

PATENT NO.: 5,935,372

DATED: August 10, 1999

INVENTOR(S): Sergio Rojxtaczer et al.

It is certified that error appears in the above-identified patent and that said Letters Patent is hereby corrected as shown below:

Column 7, line 48, in the table, before "$G_9$" insert -- Low MW oligomer of --

Column 9, line 7, in the table, insert the "Modulus of Elasticity" for Example 16 as -- 0.68 --; for Example 20 as -- 0.63 --; and for Example 21 as -- 0.71 --.

Column 9, line 24, delete "$G_{13}$" and substitute "$G_{25}$".
Column 9, line 32, after "weight" insert -- (MW = 4039) --
Column 9, line 32, after "B4400" insert -- (5-(2,5-dioxotetrahydrofuryl)-3-methyl-3-cyclohexene-1,2-dicarboxylic anhydride) --

UNITED STATES PATENT AND TRADEMARK OFFICE
CERTIFICATE OF CORRECTION

PATENT NO. : 5,935,372
DATED : August 10, 1999
INVENTOR(S) : Sergio Rojxtaczer et al.

It is certified that error appears in the above-identified patent and that said Letters Patent is hereby corrected as shown below:

Claim 19, column 12, line 31, after "amount," delete "is" and substitute -- of --

Signed and Sealed this

Second Day of May, 2000

Q. TODD DICKINSON

*Attest:*

*Attesting Officer*  *Director of Patents and Trademarks*